US006682381B1

(12) United States Patent
Michael

(10) Patent No.: US 6,682,381 B1
(45) Date of Patent: Jan. 27, 2004

(54) ANALYSIS OF MERCURY IN FLUORESCENT LAMPS BY COLD SPOTTING

(75) Inventor: Joseph Darryl Michael, Schoharie, NY (US)

(73) Assignee: General Electric Company, Niskayuna, NY (US)

( * ) Notice: Subject to any disclaimer, the term of this patent is extended or adjusted under 35 U.S.C. 154(b) by 459 days.

(21) Appl. No.: 09/628,374

(22) Filed: Jul. 31, 2000

(51) Int. Cl.[7] .............................. H01J 9/42; H01J 9/50; H01J 9/52; H01J 9/38; G01F 1/68

(52) U.S. Cl. .............................. 445/3; 445/38; 445/39; 445/54; 73/202.5; 73/204.1; 73/861; 73/204.9

(58) Field of Search .............................. 445/3, 38, 39, 445/54; 313/11, 13, 34; 73/202.5, 204.1, 861, 204.9

(56) References Cited

U.S. PATENT DOCUMENTS 3,162,499 A * 12/1964 Gustin ......................... 445/54
3,309,565 A 3/1967 Clark et al. ................. 315/117
3,711,248 A * 1/1973 Coffey ......................... 436/36
3,788,724 A * 1/1974 Schenkels et al. ............ 445/39
4,529,912 A 7/1985 Northrup et al. ........... 315/117
5,204,578 A * 4/1993 Dever et al. .................. 313/25
5,882,237 A 3/1999 Sarver et al. .................. 445/9
5,907,216 A * 5/1999 Ligthart et al. ............. 313/564
5,909,085 A 6/1999 Nelson ........................ 315/94

FOREIGN PATENT DOCUMENTS

JP 08260068 A * 10/1996 ........... C22B/43/00

* cited by examiner

*Primary Examiner*—Kenneth J. Ramsey
*Assistant Examiner*—Mariceli Santiago
(74) *Attorney, Agent, or Firm*—Jean K. Testa; Patrick K. Patnode

(57) ABSTRACT

A method of analyzing a first gas in a lamp, including: cooling at least a first portion of a lamp below the condensation temperature of the first gas contained in the lamp while operating the lamp; maintaining the temperature of the first portion below the condensation temperature of the first gas until essentially all the available first gas contained in the lamp condenses on the surface of at least the first portion of the lamp; removing a second portion of the lamp, the second portion containing the condensed first gas; and analyzing at least one of the condensed first gas or the remaining bound gas.

37 Claims, 4 Drawing Sheets

ANALYSIS OF MERCURY IN FLUORESCENT LAMPS BY COLD SPOTTING

FIELD OF THE INVENTION

The present invention is directed generally to a method of separating gases in a fluorescent lamp, and more particularly to a method of analyzing mercury in a fluorescent lamp.

BACKGROUND OF THE INVENTION

In a mercury fluorescent lamp, light is generated by producing an electrical discharge in a tube filled with a mixture of mercury and an inert gas. The electrical discharge excites the mercury atom causing an outer shell electron to jump to a higher orbit. When the excited electron returns to its former energy level, it gives up energy in the form of ultraviolet radiation. This radiation is absorbed by a fluorescent phosphor coating on the inside of the lamp tube and re-radiated as visible light.

When manufacturing a fluorescent lamp tube, a small drop of liquid mercury is inserted into the lamp tube, an inert gas, typically argon, neon, xenon, krypton or a mixture thereof is charged into the tube and the tube is then sealed. Typically, a large excess of mercury is put in the tube in order to control the vapor pressure with an excess of mercury. For example, U.S. Pat. Nos. 3,309,565 and 4,529,912 teach that the vapor pressure of mercury is determined by the coldest portion of the bulb and therefor the optimum vapor pressure can be achieved by controlling the temperature of a spot on the lamp tube. U.S. Pat. No. 5,882,237 teaches that the vapor pressure of mercury can be controlled by forming a mercury zinc amalgam with excess mercury. U.S. Pat. No. 5,909,085 teaches controlling the vapor pressure by a combination of thermal control and amalgam formation. These patents do not teach condensing all the mercury or analyzing bound or available mercury.

It is known that the luminosity of a fluorescent lamp is a function of the vapor pressure of the mercury during operation. It is also known that the vapor pressure of mercury in the light tube is a function of the temperature of the tube. The maximum luminosity of a fluorescent lamp is typically achieved at a pressure of approximately 6–7 milliTorr (mtorr) which is generated at a temperature of approximately 40° C. Deviation from this pressure, either above or below, results in reduced luminosity. It is therefore desirable to have enough mercury in the tube to generate a partial pressure of about 7 mtorr. From an economic and environmental standpoint, however, it is preferable to have as small an excess of mercury in the tube as possible. Therefore, providing excess mercury to achieve the desired mercury partial pressure is not desirable.

The prior art methods of controlling the mercury vapor pressure using excess mercury result in an inefficient use of mercury and reduced lamp luminosity. Therefore, it would be desirable to obtain an accurate method of measuring the distribution of mercury in the lamp tube to obtain improved lamp luminosity while using as little excess mercury as possible.

BRIEF SUMMARY OF THE INVENTION

The invention relates to a method of condensing a gas comprising: cooling at least a first portion of a vessel containing a first gas below a condensation temperature of said first gas; maintaining the temperature of said first portion of said vessel below the condensation temperature until said first gas condenses on a surface of at least a second portion of said vessel; removing said second portion of said vessel, said second portion containing the condensed first gas; and analyzing at least one of said condensed first gas or the bound first gas.

The invention also relates to a method of manufacturing a fluorescent lamp, comprising: cooling at least a first portion of a test lamp below the condensation temperature of mercury contained in said test lamp while operating said test lamp; maintaining the temperature of said first portion below the condensation temperature of said mercury until substantially all the available mercury contained in the test lamp condenses on the surface of at least the first portion of said test lamp; removing a second portion of said lamp, said second portion containing the condensed mercury; and analyzing at least one of said condensed mercury or the bound mercury remaining in the test lamp to determine the amount of available or bound mercury present in the lamp; and placing a first amount of mercury into at least a first fluorescent lamp based on the amount of available mercury determined during the analyzing step.

DETAILED DESCRIPTION OF THE INVENTION

The present inventor has determined that not all of the mercury in the tube or vessel of a fluorescent lamp is available for excitation and hence, for generation of light. Some of the mercury binds with the phosphor and with the glass tube and is not available for light generation. Sodium rich glasses in particular consume a significant amount of mercury. However, even sodium free glass consumes mercury. The type of phosphor also has a significant effect on the amount of mercury consumed. Silicate based phosphors bind a relatively large amount of mercury while alumina based phosphors bind a much smaller amount of mercury. Impurities in the lamp vessel may also bind mercury. Once bound, this mercury is not available for light generation.

The present inventor has determined that the amount of bound mercury also varies with the type and shape of lamp vessel. Fluorescent light vessels may be, for example, tube shaped, bulb shaped, straight, curved, or circular and may vary greatly in size. The above examples are for illustration purposes only and should not be considered limiting. The present inventor has also determined that the amount of bound mercury can be reduced by heating the light vessel at temperatures well above normal operating temperatures. Bound mercury may be released by heating the lamp vessel at 80° C., for example.

Figure 1:
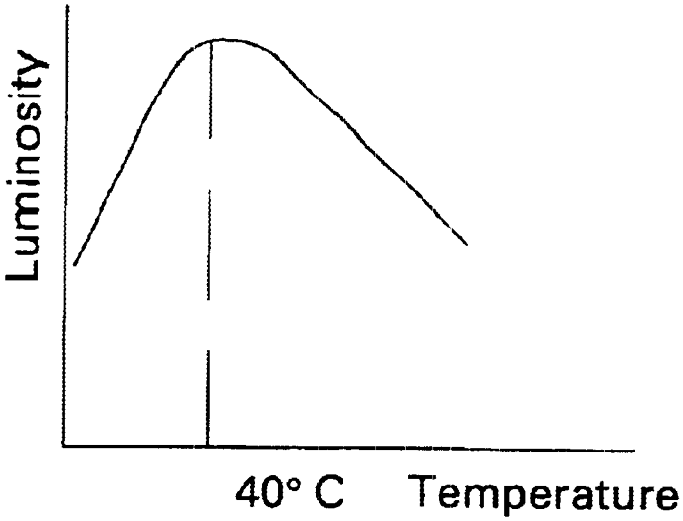
FIG. 1 is a graph showing luminosity as a function of temperature.
Figure 2:
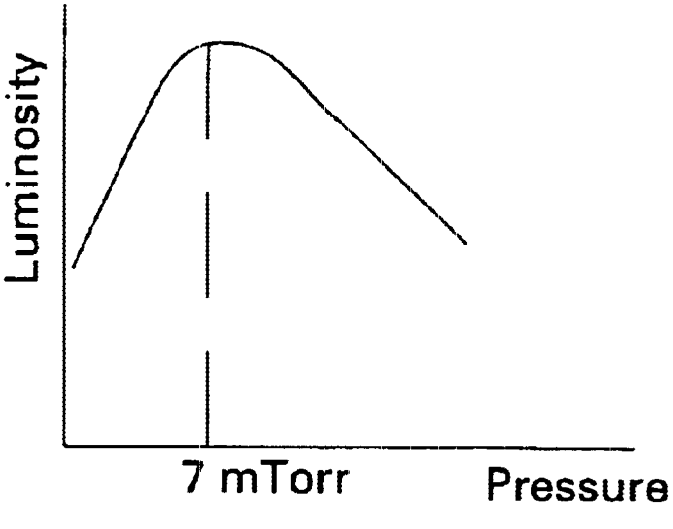
FIG. 2 is a graph showing luminosity as a function of mercury pressure.

FIG. 1 is a schematic illustration of the fluorescent luminosity as a function of temperature for a typical fluorescent lamp vessel while FIG. 2 illustrates the luminosity as a function of mercury vapor pressure. As can be seen in the figures, maximum luminosity occurs at a temperature of approximately 40° C. and a mercury vapor pressure of approximately 7 mtorr. The ideal lamp should have just enough mercury to operate at the optimum conditions. This is important from both an economic and an environmental standpoint.

From an economic standpoint, any mercury in excess of that which is necessary to operate the lamp under optimum conditions is wasted. Insufficient mercury will also cause the lamp luminosity to deviate from an optimum value. In addition to the economic incentive, however, there is a strong environmental incentive for minimizing the mercury content in fluorescent lamps. Mercury is a toxic substance that acts as a heavy metal poison. Its vapor is readily absorbed through the respiratory tract. Minimizing the amount of mercury per lamp tube not only minimizes health risk due to breakage, but also reduces the amount of mercury that must be processed and disposed of from spent tubes.

In order to manufacture lamp vessels with an optimum and efficient use of mercury, the amount of bound mercury must be accurately determined for each configuration of the lamp vessel. Underestimating the amount of mercury that binds to the phosphor or the vessel will result in insufficient mercury available for operation. Overestimating the amount of bound mercury will result in excess mercury being charged into the vessel. Deviation from the optimum amount of mercury will also result in a decrease in the lamp luminosity.

Figure 3:
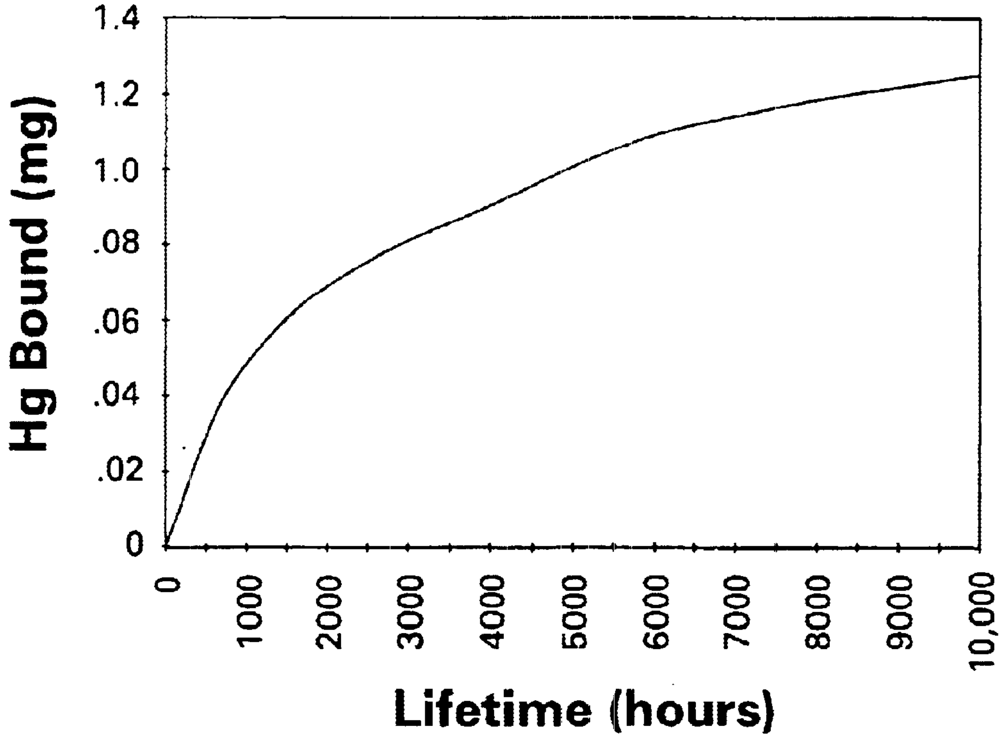
FIG. 3 is graph of the consumption of mercury as a function of time for a typical lamp.

A further complication is that the amount of bound mercury increases with time during the operation of the lamp. This is demonstrated in FIG. 3. FIG. 3 illustrates the amount of mercury that becomes bound during operation of a typical fluorescent lamp vessel over the course of 10,000 hours of operation. Approximately half of the bound mercury is bound within the first 2000 hours of operation, however, the amount of mercury bound in the lamp vessel continues to increase throughout the life of the vessel. By operating the lamp for a time corresponding to the lamp operating lifetime then condensing the mercury, an accurate determination of the amount of bound mercury can be obtained. With this information, it is possible to charge a lamp vessel with sufficient mercury for operation over the desired lifetime of the lamp without adding a large excess of mercury.

Figure 4:
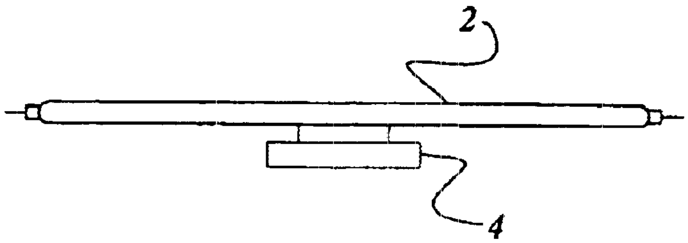
FIG. 4 is a side view of a preferred embodiment of the invention.

FIG. 4 illustrates a side view of the first preferred embodiment of the invention. A fluorescent light vessel, such as tube 2 is supported by any suitable means, such as clamps or support rods (not shown in the figure). The lamp vessel may be a brand new lamp vessel or it may be a lamp vessel that has been operating for a predetermined amount of time. Preferably the lamp vessel was operated for an amount of time equal to the desired lamp lifetime in order to determine a sufficient amount of available mercury required to operate the lamp throughout its desired lifetime. The tube 2 contains mercury and an inert gas, such as argon, neon, krypton or xenon. Power is supplied to tube 2, causing the lamp to begin operating. A thermoelectric cooler 4 comprising multiple Peltier devices is placed in contact with tube 2. The thermoelectric cooler typically lowers the surface temperature of a cold region (the area corresponding to the contact region of the thermoelectric cooler) on the tube to approximately 0 to −40° C. At this temperature any mercury vapor coming in contact with the wall condenses. After approximately 9 hours (for a lamp with a mercury dosage of 5–8 mg of mercury), all of the unbound (available) mercury condenses on the tube wall at or around the cold region. However, the inert gas preferably does not condense. Alternatively, the thermoelectric cooler 4 may be used to condense the available mercury while the lamp is turned off.

Figure 5:
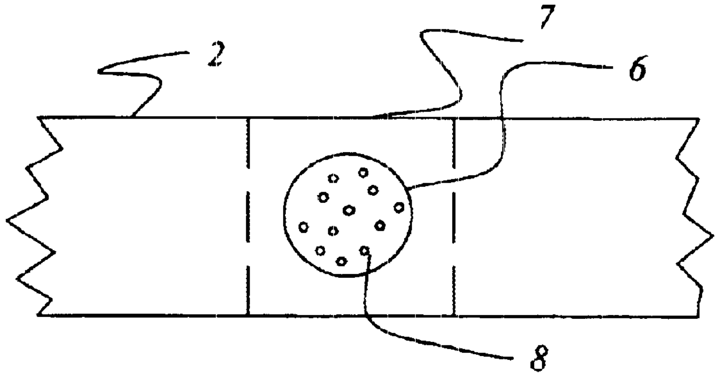
FIG. 5 is an enlarged view of a section of the tube of FIG. 4.

FIG. 5 illustrates a close up of the tube after mercury condensation has been completed. The dashed lines in FIG. 5 correspond to the outer edges of the thermoelectric cooler 4 and define the cold region 7. The cooling and condensation results in the formation of a visible region 6 of condensed mercury on the tube wall. Within visible region 6 are condensed mercury droplets 8.

Figure 6:
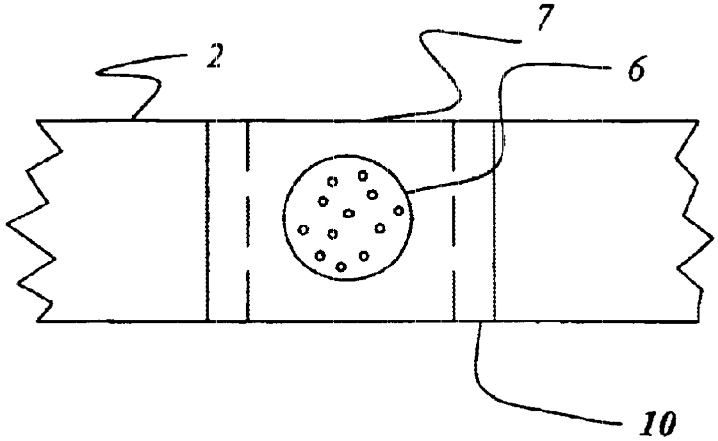
FIG. 6 is an enlarged view of a section of the tube of FIG. 4.

After the condensation is complete, thermoelectric cooler 4 is switched off and the tube is sectioned. Sectioning may be carried out by cutting a portion of a tube with a saw or other cutting implement. FIG. 6 illustrates one embodiment of the sectioning. In this embodiment, the sectioned region 10 containing the condensed mercury 6 is larger than and centered about cold region 7. This, of course, is not necessary. Sectioned region 10 may also be the same size as or smaller than the cold region 7. It is also not necessary that sectioned region 10 be centered about cold region 7. The visible region 6 containing all the condensed, available mercury is then separated from the rest of the tube 2. Thus, the sectioned region 10 containing all the available mercury is removed, leaving substantially all the bound mercury in the remaining tube 2.

Having separated the available mercury from the bound mercury, the amount of mercury bound to the vessel or tube 2 (i.e., to the glass, phosphor and impurities in the tube) is then determined. This can be accomplished in several ways. The following examples are for illustration only and should not be considered limiting. In the first preferred method, tube 2, without sectioned region 10, is crushed and then immersed in a bath of acid, dissolving all of the bound mercury. The acid solution is then diluted, and the diluted solution is injected into an atomic absorption machine, e.g., available from Perkin Elmer. The concentration of the bound mercury is determined by comparison to a known mercury standard. Given the concentration, the total amount of bound mercury is calculated.

In the second preferred method, sectioned region 10 is immersed in acid, dissolving all the condensed available mercury. The acid solution is diluted and the concentration of available mercury is determined by atomic absorption. The total amount of available mercury is then calculated. The amount of available mercury is subtracted from the total amount of mercury charged in the lamp, yielding the amount of bound mercury.

In the third preferred method, the initial mercury charged into the lamp is doped with a known amount of radioactive mercury. The lamp is operated and spot cooled as discussed above. Upon sectioning, the remaining tube 2 is subject to radioactive analysis to determine the amount of bound mercury.

In the fourth preferred method, the initial mercury charged into the lamp is doped with a known amount of radioactive mercury. The lamp is operated and spot cooled as discussed above. Upon sectioning, section 10 is subject to radioactive analysis to determine the amount of available mercury. The amount available mercury is subtracted from the total amount of mercury charged in the lamp, yielding the amount of bound mercury.

In the fifth preferred method, the initial mercury charged into the lamp is doped with a known amount of radioactive mercury. The lamp is operated and spot cooled as discussed above. Unlike the fourth preferred method, the lamp is not sectioned. Instead, the lamp is subject to radioactive analysis through the lamp vessel. The amount of bound mercury is determined by measuring the local radioactivity throughout the lamp vessel.

The first preferred embodiment is advantageous because it allows the direct determination of the amount of available and/or spatially resolved, bound mercury after the lamp had been operated for a known period of time, say 10,000 hours. Since the ratio of bound to available mercury is dependent on the duration of lamp operation, the first preferred embodiment allows spatially resolved determination of the amount of mercury that is bound and/or available after a specified operating period.

Figure 7:
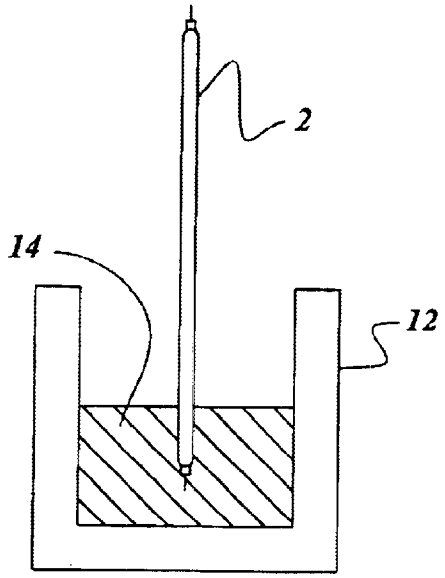
FIG. 7 is a side view of a preferred embodiment of the invention.

FIG. 7 illustrates the second preferred embodiment of the invention. In this embodiment, lamp vessel or tube 2 is placed in a second vessel 12 and packed in dry ice 14. Power may be supplied to the tube causing it to operate. Alternatively, the lamp may be turned off. The surface of the tube 2 in contact with the dry ice is cooled below the condensation temperature of the mercury. Tube 2 is kept in vessel 12 until all of the available mercury condenses in the cold region in contact with the dry ice 14. Tube 2 is then sectioned and the amount of bound and/or available mercury is determined by any of the preferred analysis methods discussed above. The dry ice 14 may be applied to an end of the tube 2 or a middle portion thereof.

Figure 8:
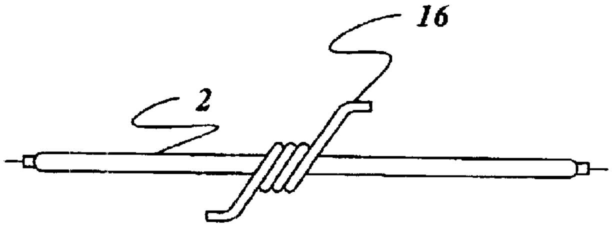
FIG. 8 is a side view of a preferred embodiment of the invention.

FIG. 8 illustrates the third preferred embodiment of the invention. In this embodiment, a refrigeration coil 16 is wrapped around the lamp vessel or tube 2. The surface of the tube 2 within coil 16 is cooled below the condensation temperature of the mercury. Tube 2 is kept within coil 16 until all of the available mercury condenses in the cold region. Tube 2 is then sectioned and the amount of bound and/or available mercury determined by any of the preferred analysis methods discussed above. In this embodiment, the lamp may be turned on or off, as desired.

Figure 9:
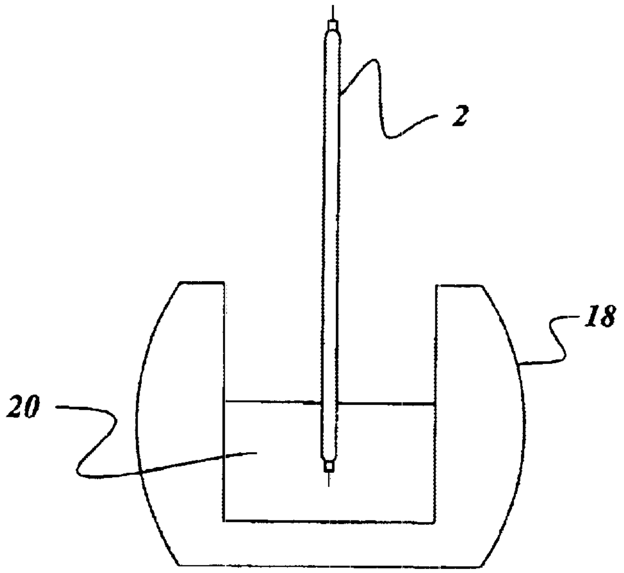
FIG. 9 is a side view of a preferred embodiment of the invention.

FIG. 9 illustrates the fourth preferred embodiment of the invention. In this embodiment, lamp vessel or tube 2 is held in vessel 18. Vessel 18, which may be a dewar, thermos, or any other suitable vessel for holding extremely cold liquids, is then filled with a coolant which is at a temperature below the condensation temperature of mercury. Liquid oxygen, liquid nitrogen, liquid argon and liquid helium are suitable coolants. Any other coolant that can be cooled below the condensation temperature of mercury can also be used. After all the available mercury is condensed, tube 2 is sectioned and the amount of bound and/or available mercury determined by any of the preferred analysis methods discussed above.

The preferred embodiments have been set forth herein for the purpose of illustration. However, this description should not be deemed to be a limitation on the scope of the invention. Accordingly, various modifications, adaptations, and alternatives may occur to one skilled in the art without departing from the spirit and scope of the claimed inventive concept.

What is claimed is:

1. A method for determining total amount of a first gas, which amount is available for excitation by an electrical discharge in a vessel, the method comprising:

cooling at least a first portion of said vessel containing said first gas to a temperature below a condensation temperature of said first gas;

maintaining the temperature of said first portion of said vessel below said condensation temperature until all of an unbound portion of said first gas condenses on a surface of said at least a first portion of said vessel;

measuring an amount of said unbound portion of said first gas that condenses on said surface of said first portion of said vessel, said amount being available for excitation by said electrical discharge; and measuring an amount of bound portion of said first gas in parts of said vessel other than said first portion of said vessel.

2. The method of claim 1, wherein the said vessel comprises a fluorescent lamp tube.

3. The method of claim 1, wherein said first gas comprises mercury.

4. The method of claim 3, wherein said vessel further contains a second gas that comprises an inert gas.

5. The method of claim 4, wherein said inert gas is selected from the group consisting of argon, neon, krypton and xenon.

6. The method of claim 4, wherein said second gas remains in a gas phase when the first gas condenses.

7. The method of claim 1, wherein said cooling step comprises contacting said first portion with a thermoelectric cooler.

8. The method of claim 7, wherein said thermoelectric cooler comprises at least one Peltier device.

9. The method of claim 1, wherein said cooling step comprises placing a refrigeration coil adjacent to said first a portion.

10. The method of claim 1, wherein said cooling step comprises placing said first vessel in a second vessel containing dry ice.

11. The method of claim 1, wherein said cooling step comprises placing said first vessel in a second vessel containing a liquid coolant.

12. The method of claim 11, wherein said liquid coolant is selected from the group consisting of liquid oxygen, liquid nitrogen, liquid argon and liquid helium.

13. The method of claim 1, wherein only the first portion of said vessel is cooled below the condensation temperature of said first gas.

14. The method of claim 13, wherein said vessel contains said first gas and a second gas, and wherein only said first gas condenses.

15. The method of claim 14, wherein said first gas comprises mercury and said vessel comprises a fluorescent lamp tube or bulb.

16. The method of claim 15, wherein said cooling step comprises contacting only said first portion with a thermoelectric device.

17. A method of condensing a gas, comprising:

cooling a first portion of a first vessel, which contains a first gas and a second gas, below a condensation temperature of said first gas, said first gas comprising mercury, said second gas comprising an inert gas, said first vessel being selected from the group consisting of a fluorescent lamp tube and a fluorescent lamp bulb;

maintaining the temperature of said first portion of said first vessel below said condensation temperature until all of said first gas condenses on the surface of at least the first portion of said first vessel; and removing a second portion of said first vessel, said second portion including condensed mercury;

wherein step of cooling comprises contacting said first portion with a thermoelectric device, and only said first gas condenses upon said cooling.

18. The method of claim 17, wherein said second portion includes said mercury, which condenses upon said cooling.

19. The method of claim 18, further comprising the steps of:

removing said condensed mercury; and analyzing at least one of: an amount of said condensed mercury on said removed second portion, and an amount of bound mercury remaining in the first vessel.

20. The method of claim 19, wherein the step of analyzing comprises;

dissolving said bound mercury in acid to produce a mercury-containing solution; and measuring a concentration of mercury in said mercury-containing solution.

21. The method of claim 20, wherein the step of measuring comprises;

diluting the mercury-containing solution; and measuring the mercury concentration in said solution with atomic absorption.

22. A method of condensing a gas, comprising:

(a) cooling a first portion of a first vessel, which contains a first gas and a second gas, below a condensation temperature of said first gas, said first gas comprising mercury, said second gas comprising an inert gas, said first vessel being selected from the group consisting of a fluorescent lamp tube and a fluorescent lamp bulb, wherein step of cooling comprises contacting said first portion with a thermoelectric device, and only said first gas condenses upon said cooling;

(b) maintaining a temperature of said first portion of said first vessel below said condensation temperature until all of said first gas condenses on the surface of at least the first portion of said first vessel;

(c) removing a second portion of said first vessel, said second portion including condensed mercury;

(d) removing the condensed mercury; and (e) analyzing said condensed mercury on said removed second portion, and bound mercury remaining in the first vessel, said step of analyzing comprising:

(1) dissolving said bound mercury in acid to produce a mercury-containing solution;

(2) diluting the mercury-containing solution; and (3) measuring a mercury concentration of the mercury-containing solution with atomic absorption;

wherein said second portion comprises a portion of said first vessel which is smaller the same as, or larger than the first portion of said first vessel.

23. The method of claim 22, wherein said first gas is condensed while said fluorescent light tube or bulb is operating.

24. A method for determining an amount of a first gas, which amount is available for excitation by an electrical discharge in a vessel, the method comprising:

cooling at least a first portion of a said vessel containing a said first gas to a temperature below a condensation temperature of said first gas;

maintaining the temperature of said first portion of said vessel below said condensation temperature until said first gas condenses on a surface of at least a second portion of said vessel, producing a condensed first gas;

removing said second portion of said vessel, said second portion containing the condensed first gas; and determining at least one of an amount of said condensed first gas and an amount of bound first gas remaining in the vessel.

25. A method of condensing a gas comprising:

cooling at least a first portion of a vessel containing a first gas below a condensation temperature of said first gas;

maintaining the temperature of said first portion of said vessel below the condensation temperature until said first gas condenses on a surface of at least a second portion of said vessel, producing a condensed first gas;

removing said second portion of said vessel, said second portion containing the condensed first gas; and analyzing at least one of said condensed first gas and bound first gas remaining in said vessel, wherein said first gas is mercury and said vessel is a fluorescent lamp tube or bulb.

26. The method of claim 25, wherein said first gas is condensed while said fluorescent lamp tube is operating.

27. The method of claim 26, wherein said fluorescent lamp tube further contains a second inert gas which does not condense during the step of maintaining.

28. The method of claim 27, wherein said cooling step comprises contacting said first portion with a thermoelectric cooler.

29. The method of claim 28, wherein said second portion comprises a portion of said first vessel which is smaller than, the same as, or larger than the first portion of said first vessel.

30. The method of claim 29, wherein substantially all available unbound mercury condenses on the surface of at least the second portion of said vessel during the step of maintaining.

31. A method of condensing a gas comprising:

cooling at least a first portion of a vessel containing a first gas below a condensation temperature of said first gas, said first gas comprising mercury, said vessel being selected from the group consisting of fluorescent lamp tube and fluorescent lamp bulb, said vessel being a part of a fluorescent lamp, said vessel further comprising a second gas that is an inert gas, said cooling being carried out by contacting said first portion with a thermoelectric cooler;

maintaining the temperature of said first portion of said vessel below the condensation temperature until said first gas condenses on a surface of at least a second portion of said vessel, producing a condensed first gas, said maintaining being carried out while said fluorescent lamp is operating, said second portion being smaller than, the same as, or lager than said first portion;

removing said second portion of said vessel, said second portion containing said condensed first gas; and analyzing at least one of: said condensed first gas and bound first gas remaining in the first vessel, wherein said analyzing step comprises determining at least one of an amount of bound mercury and an amount of available unbound mercury present in the fluorescent lamp during operation of said fluorescent lamp.

32. A method of manufacturing a new fluorescent lamp, comprising:

cooling at least a first portion of a test lamp to a temperature below a condensation temperature of mercury contained in said test lamp while operating said test lamp;

maintaining the temperature of said first portion below the condensation temperature of said mercury until substantially all available unbound mercury contained in the test lamp condenses on the surface of at least the first portion of said test lamp, forming condensed mercury;

removing a second portion of said lamp, said second portion containing the condensed mercury;

determining an amount of bound mercury remaining in the test lamp; and placing a amount of mercury into the new fluorescent lamp, said total amount being equal to a sum of a first amount equal to said amount of bound mercury determined during the step of determining and a second amount of mercury that produces a maximum lamp luminosity when said new fluorescent lamp is normally operated.

33. The method of claim 32, wherein said new fluorescent lamp further includes a second gas mixed with said total amount of mercury, said second gas comprising an inert gas.

34. The method of claim 33, wherein only the available unbound mercury condenses.

35. The method of claim 34, wherein said cooling step comprises contacting said first portion with a thermoelectric cooler.

36. The method of claim 35, wherein the step of cooling is carried out after the test lamp has been operating for a time greater or equal to a pre-selected lifetime of the test lamp.

37. The method of claim 36, wherein the second amount of mercury is sufficient to produce a vapor pressure of about 7 mtorr when the new fluorescent lamp is normally operated.

* * * * *